US012779873B2

(12) United States Patent

Takaori

(10) Patent No.: US 12,779,873 B2
(45) Date of Patent: Nov. 3, 2026

(54) INKJET RECORDING APPARATUS

(71) Applicant: KYOCERA Document Solutions Inc., Osaka (JP)

(72) Inventor: Yasuko Takaori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 253 days.

(21) Appl. No.: 18/763,345

(22) Filed: Jul. 3, 2024

(65) Prior Publication Data

US 2025/0010631 A1 Jan. 9, 2025

(30) Foreign Application Priority Data

Jul. 5, 2023 (JP) ................................ 2023-110405

(51) Int. Cl.
*B41J 2/18* (2006.01)
*B41J 2/01* (2006.01)
(Continued)

(52) U.S. Cl.
CPC . *B41J 2/18* (2013.01); *B41J 2/01* (2013.01); *B41J 2/175* (2013.01); *B41J 2/17596* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538;
(Continued)

(56) References Cited

U.S. PATENT DOCUMENTS

2008/0152828 A1* 6/2008 Mukai .................... C09D 11/30
427/466
2011/0234727 A1* 9/2011 Aoki .................... B41M 5/0011
347/102
(Continued)

FOREIGN PATENT DOCUMENTS

JP 2019171754 A 10/2019

*Primary Examiner* — Manish S Shah
(74) *Attorney, Agent, or Firm* — Studebaker Brackett PLLC

(57) ABSTRACT

An inkjet recording apparatus includes an ink, a circulation type recording head, a damper member that supplies the ink to the circulation type recording head, and an ink supply unit that supplies the ink to the damper member. The circulation type recording head ejects to a recording medium at least a portion of the ink supplied from the damper member and discharges the rest of the ink to the ink supply unit. The ink supply unit includes a relief mechanism. The relief mechanism adjusts the pressure of the ink supplied to the damper member to a level no greater than a predetermined value. The ink contains a pigment, binder resin particles, and an aqueous medium. The binder resin particles have a zeta potential of at least −60.0 mV and no greater than −45.0 mV.

12 Claims, 2 Drawing Sheets

(51) Int. Cl.

| | |
|---|---|
| ***B41J 2/175*** | (2006.01) |
| ***B41J 2/21*** | (2006.01) |
| ***B41M 5/52*** | (2006.01) |
| ***C09D 11/322*** | (2014.01) |
| ***C09D 11/40*** | (2014.01) |

(52) U.S. Cl.
CPC .......... *B41J 2/2107* (2013.01); *B41M 5/5218* (2013.01); *C09D 11/322* (2013.01); *C09D 11/40* (2013.01)

(58) Field of Classification Search
CPC .............. B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2015/0344710 | A1* | 12/2015 | Ohnishi | C09D 11/102<br>347/20 |
| 2017/0291426 | A1* | 10/2017 | Hara | B41J 2/175 |
| 2018/0030298 | A1* | 2/2018 | Yamazaki | C09D 11/30 |
| 2019/0232666 | A1* | 8/2019 | Tsuji | B41J 2/175 |
| 2020/0108630 | A1* | 4/2020 | Ozawa | B41J 2/2107 |
| 2022/0325122 | A1* | 10/2022 | Asakawa | C09D 11/322 |

* cited by examiner

INKJET RECORDING APPARATUS

INCORPORATION BY REFERENCE

The present application claims priority under 35 U.S.C. § 119 to Japanese Patent Application No. 2023-110405, filed on Jul. 5, 2023. The contents of this application are incorporated herein by reference in their entirety.

BACKGROUND

The present disclosure relates to an inkjet recording apparatus.

For performing inkjet recording using an ink that tends to dry quickly or an ink with a pigment or the like that tends to readily settle, an inkjet recording apparatus including a circulation type recording head as a recording head is suitable. The inkjet recording apparatus including a circulation type recording head is required to achieve ink circulation stability and stability of ink ejection amount. The term ink circulation stability refers to performance that allows for stable ink circulation over an extended period of time by inhibiting occurrence of ink agglomeration during ink circulation and inhibiting a decrease in stability of ink circulation flow rate. Also, the term stability of ink ejection amount refers to performance that inhibits variation in ink ejection amount even under prolonged ink circulation.

To meet requirements such as above, an inkjet recording apparatus is proposed that has a collection function of allowing agglomerate generated in an ink circulation channel to flow to a flow channel other than the ink circulation channel.

SUMMARY

An inkjet recording apparatus according to an aspect of the present disclosure includes an ink, a circulation type recording head, a damper member that supplies the ink to the circulation type recording head, and an ink supply unit that supplies the ink to the damper member. The circulation type recording head ejects to a recording medium at least a portion of the ink supplied from the damper member and discharges rest of the ink to the ink supply unit. The ink supply unit includes a relief mechanism. The relief mechanism adjusts pressure of the ink supplied to the damper member to a level no greater than a predetermined value. The ink contains a pigment, binder resin particles, and an aqueous medium. The binder resin particles have a zeta potential of at least −60.0 mV and no greater than −45.0 mV. The zeta potential is measured at 25° C. for a mixed liquid as a measurement sample containing 10 parts by mass of the binder resin particles and 90 parts by mass of water. The binder resin particles have a volume median diameter of at least 5 nm and no greater than 100 nm. The binder resin particles have a breaking elongation at 25° C. of no greater than 60%.

DETAILED DESCRIPTION

Figure 1:
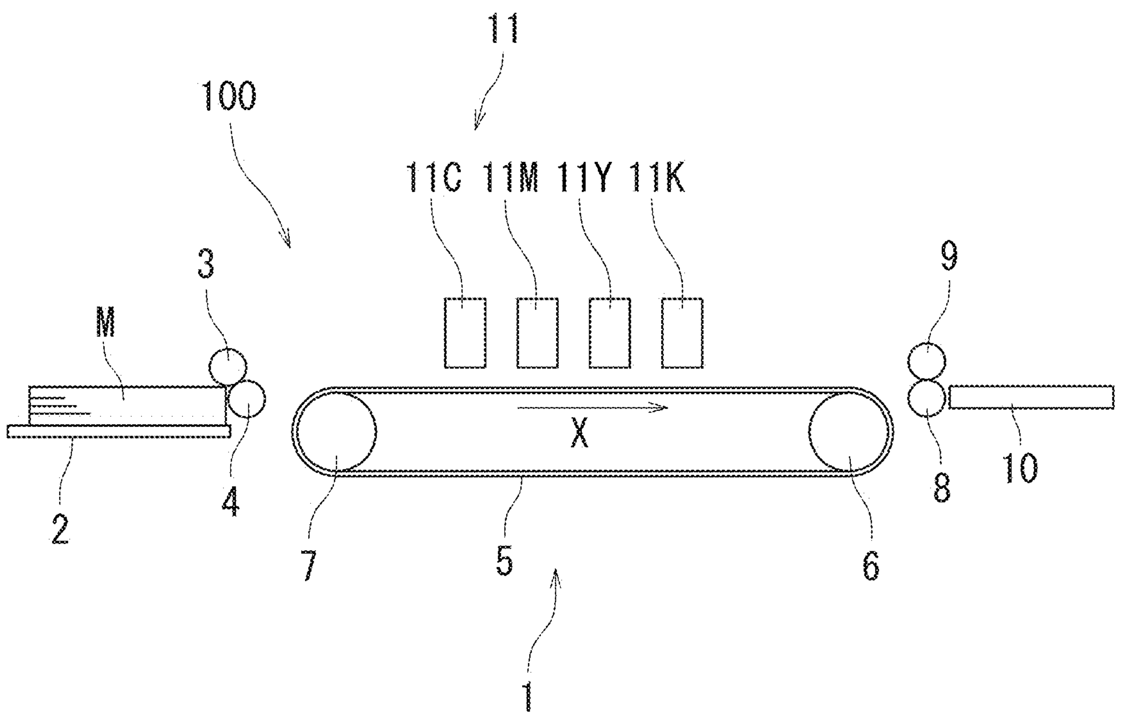
FIG. 1 is a diagram illustrating main parts of an example of an inkjet recording apparatus according to an embodiment of the present disclosure.

The following describes embodiments of the present embodiment. Note that measurement values for volume median diameter ($D_{50}$) are values as measured using a dynamic light scattering type particle size distribution analyzer (e.g., "ZETASIZER (registered Japanese trademark) NANO ZS", product of Malvern Instruments Ltd.) unless otherwise stated. In the present specification, the term "(meth)acrylate" is used as a generic term for both acrylate and methacrylate.

Values for breaking elongation are values as measured by a tensile test at 25° C. using a tensile tester in accordance with "Japanese Industrial Standards (JIS) K7127-1999. Note that in measurement of the breaking elongation of binder resin particles, a sample is prepared by film formation of binder resin particles and the tensile test is carried out on the prepared sample.

Measurement values for zeta potential are values (peak values) as measured at 25° C. using a laser Doppler type zeta potential analyzer (e.g., "ELSZ-1000", product of Otsuka Electronics Co., Ltd.) unless otherwise stated.

Measurement values for glass transition point (Tg) are values as measured in accordance with the Japanese Industrial Standards (JIS) K7121-2012" using a differential scanning calorimeter (e.g., "DSC-60", product of Shimadzu Corporation) unless otherwise stated. The glass transition point (Tg) corresponds to the temperature corresponding to a point of inflection (specifically, an intersection point of an extrapolated baseline and an extrapolated falling line) caused by glass transition in a heat absorption curve (vertical axis: heat flow (DSC signal), horizontal axis: temperature, heating rate: 5° C./min) plotted using the differential scanning calorimeter.

<Inkjet Recording Apparatus>

The following describes an inkjet recording apparatus according to an embodiment of the present disclosure. The inkjet recording apparatus of the present embodiment includes an ink, a circulation type recording head, a damper member that supplies the ink to the circulation type recording head, and an ink supply unit that supplies the ink to the damper member. The circulation type recording head ejects to a recording medium at least a portion of the ink supplied from the damper member and discharges the rest of the ink to the ink supply unit. The ink supply unit includes a relief mechanism. The relief mechanism adjusts the pressure of the ink supplied to the damper member to a level no greater than a predetermined value. The ink contains a pigment, binder resin particles, and an aqueous medium. The binder resin particles have a zeta potential of at least −60.0 mV and no greater than −45.0 mV. The zeta potential is measured at 25° C. for a mixed liquid as a measurement sample containing 10 parts by mass of the binder resin particles and 90 parts by mass of water. The binder resin particles have a volume median diameter of at least 5 nm and no greater than 100 nm. The binder resin particles have a breaking elongation at 25° C. of no greater than 60%.

As a result of having the above configuration, the inkjet recording apparatus of the present embodiment can have excellent ink circulation stability and stability of ink ejection amount. The reasons therefor are inferred as follows. When a known inkjet recording apparatus uses an ink containing binder resin particles, the ink may agglomerate during ink circulation. In particular, the ink in the known inkjet recording apparatus undergoing abrupt change in ink pressure during ink circulation tends to agglomerate. To address the above, the inkjet recording apparatus of the present embodiment includes a damper member and a relief mechanism. The damper member and the relief mechanism mitigate abrupt change (particularly, sharp pressure increase) in ink pressure during ink circulation. Therefore, the inkjet recording apparatus of the present embodiment, with the above configuration, can inhibit abrupt change in ink pressure during ink circulation and inhibit ink agglomeration during ink circulation.

Furthermore, the binder resin particles in the inkjet recording apparatus of the present embodiment have a relatively large absolute value of the zeta potential and a relatively small volume median diameter, which hardly leads to agglomeration. Furthermore, the binder resin particles have a relatively small breaking elongation (relatively hard). As such, the binder resin particles in the inkjet recording apparatus of the present embodiment hardly collapse during ink circulation to inhibit agglomeration of the collapsed binder resin particles. As a result, the inkjet recording apparatus of the present embodiment can effectively inhibit ink agglomeration during ink circulation. From the above, the inkjet recording apparatus of the present embodiment can have excellent ink circulation stability and stability of ink ejection amount.

The inkjet recording apparatus of the present embodiment is suitable for image formation on non-permeable recording media. The non-permeable recording media have inferior ink permeability to permeable recording media. The non-permeable recording media have an absorption amount of no greater than 1.0 $g/m^2$ for an aqueous medium, for example. Examples of the non-permeable recording media include resin-made recording media, metal-made recording media, and glass-made recording media. Examples of the resin-made recording media include resin sheets and resin films. The resin contained in the resin-made recording media is preferably a thermoplastic resin. Specific examples of the resin include polyethylene, polypropylene, vinyl chloride, and polyethylene terephthalate (PET). Examples of the resin-made recording media include OPP films and PET films. In image formation on a resin-made recording medium using the inkjet recording apparatus of the present embodiment, the surface (print surface) of the recording medium may be subjected to corona discharge treatment.

The ink included in the inkjet recording apparatus of the present embodiment contains a given amount of binder resin particles. As a result, when forming an image on an non-permeable recording medium, the inkjet recording apparatus of the present embodiment can easily ensure ink adhesion to the recording medium and scratch resistance of images formed on the recording media.

The ink in the present disclosure is preferably used for front printing. The term "front printing" herein refers to printing on the front side surface (surface when viewed by a viewer) of a transparent recording medium. When the viewer views a recording medium with front printing performed thereon, the positional relationship of "viewer, image, recording medium" is established, so that the viewer directly views the image.

Detailed description of the ink is made below followed by detailed description of the inkjet recording apparatus of the present embodiment. Note that only one type of the ink may be included in the inkjet recording apparatus of the present embodiment or multiple types of the inks (e.g., four types of a yellow ink, a cyan ink, a magenta ink, and a black ink) may be included therein. When the inkjet recording apparatus of the present embodiment include multiple types of inks, it is sufficient that at least one of the inks satisfies the following conditions, but it is preferable that all of the inks satisfy the following conditions. One type of each component described below may be used independently, or two or more types of the component may be used in combination.

[Ink]

The ink contains a pigment, binder resin particles, and an aqueous medium. Preferably, the ink further contains a pigment coating resin and a surfactant.

(Pigment)

The pigment in the ink constitutes pigment particles together with the pigment coating resin, for example. The pigment particles are each constituted by a core containing the pigment and the pigment coating resin covering the core, for example. The pigment coating resin is present in a dispersed state in a solvent. In terms of optimizing color density, hue, or stability of the ink, the pigment particles have a volume median diameter of preferably at least 30 nm and no greater than 200 nm, and more preferably at least 70 nm and no greater than 130 nm.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include the C.I. Pigment Blue (15, specifically 15:3). Examples of the violet pigments include C.I. Pigment Violet (19, 23, or 33). Examples of the black pigments include C.I. Pigment Black (7).

The pigment has a percentage content of preferably at least 0.5% by mass and no greater than 10.0% by mass in the ink, and more preferably at least 1.5% by mass and no greater than 4.5% by mass. As a result of the percentage content of the pigment being set to at least 0.5% by mass, the ink can form images with desired image density. As a result of the percentage content of the pigment being set to no greater than 10.0% by mass by contrast, fluidity of the ink can be ensured.

(Pigment Coating Resin)

The pigment coating resin is soluble in the aqueous medium. A portion of the pigment coating resin is present on the surfaces of the pigment particles to optimize dispersibility of the pigment particles. Another portion of the pigment coating resin is present in a dissolved state in the aqueous medium.

The pigment coating resin is preferably a styrene-(meth) acrylic resin. The styrene-(meth)acrylic resin includes a styrene unit and a repeating unit derived from at least one monomer of (meth)acrylic acid alkyl ester or (meth)acrylic acid. Examples of the (meth)acrylic acid alkyl ester include methyl (meth)acrylate, ethyl (meth)acrylate, propyl (meth) acrylate, and butyl (meth)acrylate. The styrene-(meth) acrylic resin is preferably a copolymer (X) of styrene, methyl methacrylate, methacrylic acid, and butyl acrylate. Note that the copolymer (X) is preferably neutralized with an equivalent amount of a base (e.g., potassium hydroxide or sodium hydroxide).

The repeating unit derived from styrene preferably has a percentage content of at least 10% by mass and no greater than 20% by mass to all repeating units included in the copolymer (X). The repeating unit derived from methyl methacrylate preferably has a percentage content of at least 10% by mass and no greater than 20% by mass to all the repeating units included in the copolymer (X). The repeating unit derived from methacrylic acid preferably has a percentage content of at least 35% by mass and no greater than 45% by mass to all the repeating units included in the copolymer (X). The repeating unit derived from butyl acrylate preferably has a percentage content of at least 25% by mass and no greater than 35% by mass to all the repeating units included in the copolymer (X).

The pigment coating resin has a percentage content of preferably at least 0.1% by mass and no greater than 4.0% by mass in the ink, and more preferably at least 0.5% by mass and no greater than 1.5% by mass. As a result of the percentage content of the pigment coating resin being set to at least 0.1% by mass and no greater than 4.0% by mass, ink ejection stability can be optimized.

The content of the pigment coating resin is preferably at least 10 parts by mass and no greater than 60 parts by mass relative to 100 parts by mass of the pigment in the ink, and more preferably at least 25 parts by mass and no greater than 40 parts by mass. As a result of the content of the pigment coating resin being set to at least 10 parts by mass and no greater than 60 parts by mass, ink ejection stability can be optimized.

(Binder Resin Particles)

The binder resin particles are present in a dispersed state in the aqueous medium. The binder resin particles contain a binder resin. Examples of the binder resin include urethane resin, (meth)acrylic resin, styrene-(meth)acrylic resin, (meth)acrylic-urethane resin, polyester resin, and modified polyolefin resin. The binder resin is preferably urethane resin, (meth)acrylic resin, or polyester resin, and more preferably urethane resin. The binder resin has a percentage content of preferably at least 80% by mass in the binder resin particles, more preferably at least 90% by mass, and further preferably 100% by mass.

Urethane resin is a copolymer of polyisocyanate and a diol compound or a bisphenol compound, for example.

(Meth)acrylic resin is a resin including a repeating unit derived from a (meth)acrylic acid compound. Examples of the (meth)acrylic acid compound include (meth)acrylic acid and (meth)acrylic acid alkyl ester.

Polyester resin is obtained by condensation polymerization of a polyhydric alcohol and a polybasic carboxylic acid. Examples of the polyhydric alcohol used for synthesis of the polyester resin include dihydric alcohols (e.g., diol compounds and bisphenol compounds) and tri- or higher-hydric alcohols. Examples of the polybasic carboxylic acid used for synthesis of the polyester resin include dibasic carboxylic acids and tri- or higher-basic carboxylic acids. Note that a polybasic carboxylic acid derivative (e.g., an anhydride of a polybasic carboxylic acid or a halide of a polybasic carboxylic acid) that can form an ester bond by condensation polymerization may be used instead of the polybasic carboxylic acid.

The binder resin particles have a zeta potential of at least −60.0 mV and no greater than −45.0 mV, preferably at least −60.0 mV and no greater than −50.0 mV, and further preferably at least −55.0 mV and no greater than −52.0 mV. The larger the absolute value of the zeta potential of the binder resin particles is, the less the binder resin particles agglomerate. Therefore, when the zeta potential of the binder resin particles is set to at least −60.0 mV and no greater than −45.0 mV, agglomeration of the binder resin particles can be inhibited during ink circulation, thereby bringing excellent ink circulation stability. Note that the zeta potential is measured at 25° C. for a mixed liquid as a measurement sample containing 10 parts by mass of the binder resin particles and 90 parts by mass of water.

The binder resin particles have a volume median diameter (D50) of at least 5 nm and no greater than 100 nm, preferably at least 20 nm and no greater than 65 nm, and more preferably at least 35 nm and no greater than 45 nm. As a result of the volume median diameter of the binder resin particles being set to at least 5 nm and no greater than 100 nm, agglomeration of the binder resin particles during ink circulation can be inhibited to impart excellent circulation stability to the ink.

The binder resin particles have a breaking elongation at 25° C. of no greater than 60%, preferably at least 8% and no greater than 60%, and more preferably at least 40% and no greater than 55%. As a result of the breaking elongation at 25° C. of the binder resin particles being set to no greater than 60%, the ink can exhibit excellent ink circulation stability and stability of ink ejection amount.

The binder resin has a glass transition point of preferably at least 30° C. and no greater than 110° C., preferably at least 45° C. and no greater than 90° C., and more preferably at least 45° C. and no greater than 55° C. As a result of the glass transition point of the binder resin being set to at least 30° C., the binder resin particles can be inhibited from being softened at normal temperature, thereby further effectively inhibiting ink agglomeration during ink circulation. As a result of the glass transition point of the binder resin being set to no greater than 110° C., scratch resistance of images formed with the ink and adhesion of the ink to recording media can be easily ensured.

The binder resin particles have a percentage content of preferably at least 2.0% by mass and no greater than 10.0% by mass in the ink, and more preferably at least 3.5% by mass and no greater than 6.5% by mass. As a result of the percentage content of the binder resin particles being set to at least 2.0% by mass, scratch resistance of images formed with the ink and adhesion of the ink to recording media can be optimized. As a result of the percentage content of the binder resin particles being set to no greater than 10.0% by mass, ink circulation stability and stability of ink ejection amount can be optimized.

Any of binder resin particles (1) to (4) shown in Table 1 are preferable as the binder resin particles. In Table 1, "Resin species" refers to the type of the binder resin contained in corresponding binder resin particles. "Breaking elongation" refers to breaking elongation at 25° C. "$D_{50}$" refers to volume median diameter. The numerical ranges in Table 1 indicate numerical ranges of the properties of the respective binder resin particles. For example, "45-55" for the binder resin particles (1) in the column titled "Breaking elongation" indicates that the breaking elongation of the binder resin particles (1) is in a range of at least 44% and no greater than 55".

TABLE 1

| | Resin species | Breaking elongation [%] | $D_{50}$ [nm] | Tg [° C.] | Zeta potential [mV] |
|---|---|---|---|---|---|
| 1 | Urethane resin | 45-55 | 35-45 | 45-55 | −56.0-−50.0 |
| 2 | Polyester resin | 45-55 | 75-85 | 55-65 | −58.0-−52.0 |
| 3 | Acrylic resin | 8-12 | 75-85 | 30-40 | −57.0-−51.0 |
| 4 | Urethane resin | 45-55 | 8-12 | 70-80 | −54.0-−48.0 |

(Surfactant)

The surfactant optimizes compatibility and dispersion stability of each component contained in the ink. The surfactant also optimizes permeability (wettability) of the ink to recording media. Examples of the surfactant include nonionic surfactants.

Examples of the nonionic surfactants include acetylene glycol surfactants (surfactants containing an acetylene glycol compound), silicone surfactants (surfactants containing a silicone compound), and fluorine surfactants (surfactants containing foluororesin or a fluorine-containing compound). Examples of the acetylene glycol surfactants include ethylene oxide adducts of acetylene glycol and propylene oxide adducts of acetylene glycol. Preferably, the ink contains a silicone surfactant as the surfactant.

The surfactant has a percentage content of preferably at least 0.05% by mass and no greater than 2.0% by mass in the ink, and more preferably at least 0.2% by mass and no greater than 0.5% by mass.

[Aqueous Medium]

The aqueous medium contained in the ink is a medium containing water. The aqueous medium may function as a solvent or function as a dispersion medium. Specific examples of the aqueous medium include aqueous media containing water and a water-soluble organic solvent.

(Water)

The water has a percentage content of preferably at 40.0% by mass and no greater than 80.0% by mass in the ink, and more preferably at least 55.0% by mass and no greater than 65.0% by mass.

Examples of the water-soluble organic solvent include glycol compounds, glycol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, propylene glycol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol.

Examples of the glycol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The water-soluble organic solvent is preferably a glycol compound or a glycol ether compound, more preferably 1,3-propanediol, propylene glycol, triethylene glycol monobutyl ether, or 3-methyl-1,3-butanediol, and further preferably a mixed solvent containing at least one of 1,3-propanediol or propylene glycol and at least one of triethylene glycol monobutyl ether or 3-methyl-1,3-butanediol.

The water-soluble organic solvent has a percentage content of preferably at 20.0% by mass and no greater than 50.0% by mass in the ink, and more preferably at least 32.0% by mass and no greater than 36.0% by mass.

The total percentage content of 1,3-propanediol and propylene glycol is preferably at least 10.0% by mass and no greater than 40.0% by mass in the ink, and more preferably at least 20.0% by mass and no greater than 27.0% by mass.

The total percentage content of triethylene glycol monobutyl ether and 3-methyl-1,3-butanediol is preferably at least 3.0% by mass and no greater than 15.0% by mass in the ink, and more preferably at least 6.0% by mass and no greater than 10.0% by mass.

The total percentage content of the water, 1,3-propanediol, propylene glycol, triethylene glycol monobutyl ether, and 3-methyl-1,3-butanediol is preferably at least 90% by mass in the aqueous medium, more preferably at least 99% by mass, and further preferably 100% by mass.

[Optional Component]

The ink may further contain any known additives (e.g., a solution stabilizer, an anti-drying agent, an antioxidant, a viscosity modifier, a pH adjuster, and an antifungal agent) as necessary.

[Ink Production Method]

The ink can be produced by uniformly mixing a pigment dispersion containing the pigment, a resin emulsion containing the binder resin particles, the aqueous medium, and an additional component (e.g., the surfactant) added as necessary using a stirrer, for example. In ink production, uniform mixing of each component may be followed by removal of foreign matter and coarse particles using a filter (e.g., a filter with a pore diameter of 5 μm).

[Preferable Compositions]

The ink has any of Compositions (i-1) to (i-8) shown in Table 2. Note that the numerical ranges in Table 2 indicate the ranges of the respective components in terms of percentage content [% by mass]. For example, "2.5-3.5" for Composition (i-1) in the column titled "Pigment" indicates that the pigment has a percentage content of at least 2.5% by mass and no greater than 3.5% by mass in Composition (i-1).

TABLE 2

| | i-1 | i-2 | i-3 | i-4 |
|---|---|---|---|---|
| Pigment | 2.5-3.5 | 2.5-3.5 | 2.5-3.5 | 2.5-3.5 |
| Pigment coating resin | 0.7-1.3 | 0.7-1.3 | 0.7-1.3 | 0.7-1.3 |
| Binder resin particles (1) | 4.5-5.5 | — | 7.0-9.0 | 2.5-3.5 |
| Binder resin particles (2) | — | — | — | — |
| Binder resin particles (3) | — | — | — | — |
| Binder resin particles (4) | — | 4.5-5.5 | — | — |
| 1,3-Propanediol | — | — | — | — |
| Propylene glycol | 23.0-27.0 | 23.0-27.0 | 23.0-27.0 | 23.0-27.0 |
| Triethylene glycol monobutyl ether | 7.0-9.0 | 7.0-9.0 | 7.0-9.0 | 7.0-9.0 |
| 3-Methyl-1,3-butanediol | — | — | — | — |
| Surfactant | 0.2-0.4 | 0.2-0.4 | 0.2-0.4 | 0.2-0.4 |
| Water | Rest | Rest | Reat | Rest |

| | i-5 | i-6 | i-7 | i-8 |
|---|---|---|---|---|
| Pigment | 2.5-3.5 | 2.5-3.5 | 2.5-3.5 | 2.5-3.5 |
| Pigment coating resin | 0.7-1.3 | 0.7-1.3 | 0.7-1.3 | 0.7-1.3 |
| Binder resin particles (1) | 4.5-5.5 | 4.5-5.5 | — | — |
| Binder resin particles (2) | — | — | 4.5-5.5 | — |
| Binder resin particles (3) | — | — | — | 4.5-5.5 |
| Binder resin particles (4) | — | — | — | — |
| 1,3-Propanediol | 23.0-27.0 | 26.0-30.0 | — | — |
| Propylene glycol | — | — | 23.0-27.0 | 23.0-27.0 |
| Triethylene glycol monobutyl ether | — | 4.5-5.5 | 7.5-8.5 | 7.5-8.5 |
| 3-Methyl-1,3-butanediol | 4.5-5.5 | — | — | — |
| Surfactant | 0.2-0.4 | 0.2-0.4 | 0.2-0.4 | 0.2-0.4 |
| Water | Rest | Rest | Reat | Rest |

[Apparatus Configuration]

The configuration of the inkjet recording apparatus of the present embodiment is described next in detail with reference to the accompanying drawings. Note that the drawings to be referenced schematically illustrate elements of configuration in order to facilitate understanding. Properties such as the size and number of each element of configuration illustrated in the drawings may differ from actual properties in order to facilitate preparation of the drawings.

FIG. 1 is a diagram illustrating main elements of an inkjet recording apparatus 100, which is an example of the inkjet recording apparatus of the present embodiment.

As illustrated in FIG. 1, the inkjet recording apparatus 100 primarily includes a conveyance section 1 and four recording heads 11 (circulation type recording heads) each being a circulation type line recording head. The inkjet recording apparatus 100 further includes a sheet feed tray 2, a sheet feed roller 3, a sheet feed driven roller 4, a conveyor belt 5, a belt drive roller 6, a belt driven roller 7, an ejection roller 8, an ejection driven roller 9, and an exit tray 10. The conveyor belt 5, the belt drive roller 6, and the belt driven roller 7 form part of the conveyance section 1. The sheet feed tray 2 is provided at left end, in the drawing, of the inkjet recording apparatus 100. The sheet feed tray 2 accommodates recording medium sheets M (e.g., sheets for recording use or sheets of printing paper). The sheet feed roller 3 and the sheet feed driven roller 4 are provided at one end of the sheet feed tray 2. The sheet feed roller 3 picks up the accommodated recording medium sheets M one at a time sequentially from the uppermost recording medium sheet M and feeds the recording medium sheet M to the conveyor belt 5. The sheet feed driven roller 4 is pressed against the sheet feed roller 3 to be rotationally driven.

The conveyor belt 5 is placed in a rotational manner downstream (rightward in FIG. 1) of the sheet feed roller 3 and the sheet feed driven roller 4 in terms of a conveyance direction X of the recording medium sheet M. In the following, the conveyance direction X of the recording medium sheet M indicated by the arrow in FIG. 1 may also be referred to below as a sheet conveyance direction. The conveyor belt 5 is wound between the belt drive roller 6 and the belt driven roller 7. The belt drive roller 6 is placed downstream of the belt driven roller 7 in terms of the sheet conveyance direction. The belt drive roller 6 drives the conveyor belt 5. The belt driven roller 7 is placed upstream of the belt drive roller 6 in terms of the sheet conveyance direction. The belt driven roller 7 follows the rotation of the belt drive roller 6 through the conveyor belt 5 to be rotated. When the belt drive roller 6 is rotationally driven in the clockwise direction, the recording medium sheet M is conveyed in the sheet conveyance direction.

The ejection roller 8 and the ejection driven roller 9 are provided downstream of the conveyor belt 5 in terms of the sheet conveyance direction. The ejection roller 8 is driven clockwise in the drawing to eject the recording medium sheet M with an image formed thereon out of the apparatus casing. The ejection driven roller 9 is pressed against the upper part of the ejection roller 8 to be rotationally driven. The exit tray 10 is provided downstream of the ejection roller 8 and the ejection driven roller 9 in terms of the sheet conveyance direction. The recording medium sheet M ejected out of the apparatus casing is stacked on the exit tray 10.

The four recording heads 11 includes a first recording head 11C, a second recording head 11M, a third recording head 11Y, and a fourth recording head 11K. The first recording head 11C, the second recording head 11M, the third recording head 11Y, and the fourth recording head 11K are arranged above the conveyor belt 5 at substantially regular intervals in the stated order from upstream to downstream in terms of the sheet conveyance direction. The four recording heads 11 are supported at a height at which the distance from the upper surface of the conveyor belt 5 is a specific length. The four recording heads 11 each record an image on the recording medium sheet M being conveyed on the conveyor belt 5. Inks (first ink, second ink, third ink, and fourth ink) in mutually different colors (cyan, magenta, yellow, and black) are supplied to the respective four recording heads 11. The four recording heads 11 eject the respective inks by ink jetting to the recording medium sheet M in predetermined order. Thus, a color image is formed on the recording medium sheet M. The four recording heads 11 are piezoelectrically driven, for example.

Figure 2:
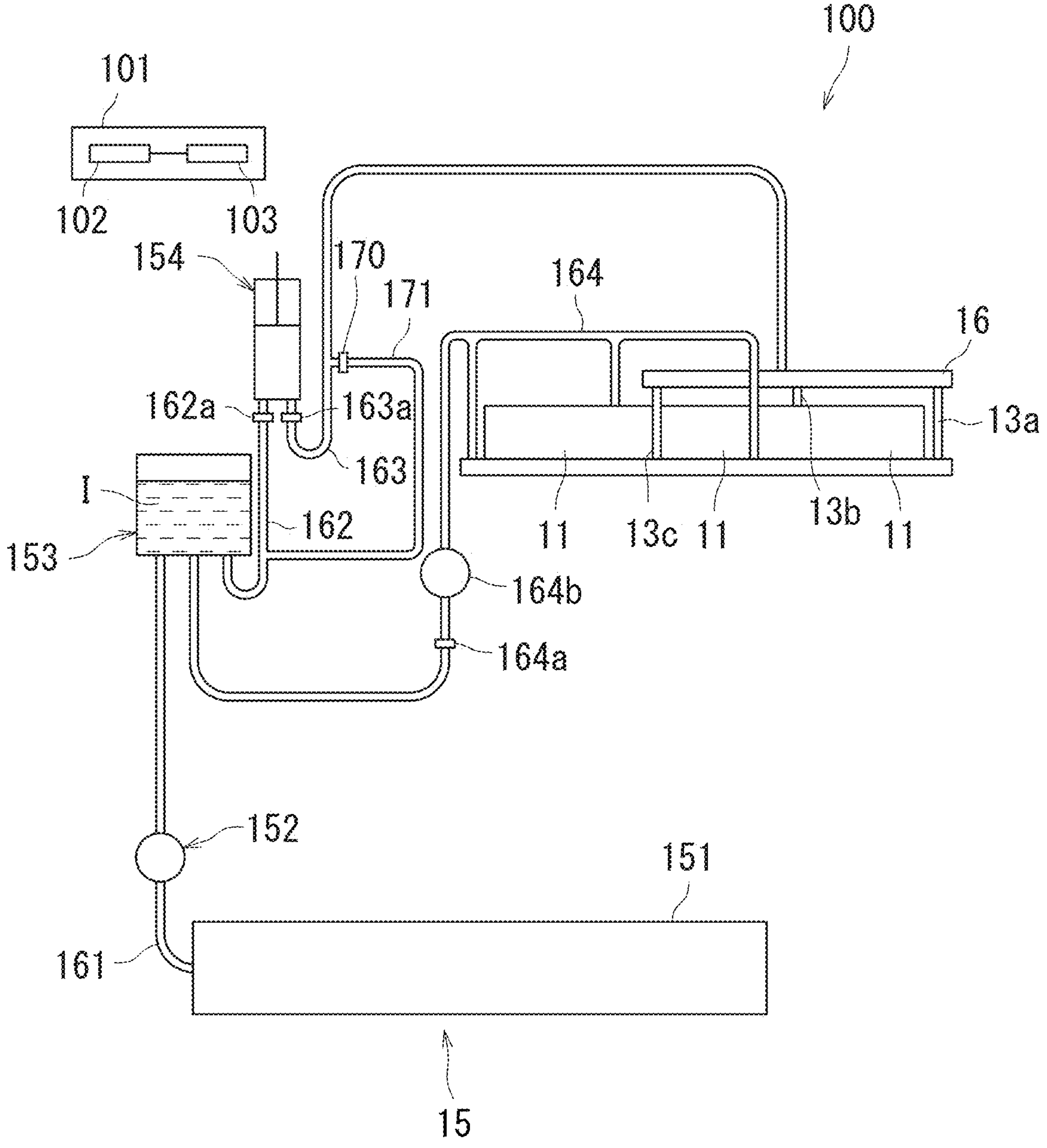
FIG. 2 is a diagram illustrating members in association with ink circulation in the inkjet recording apparatus of FIG. 1.

The inkjet recording apparatus 100 is further described with reference to FIG. 2. FIG. 2 is a diagram illustrating members in association with ink circulation in the inkjet recording apparatus 100.

As illustrated in FIG. 2, the inkjet recording apparatus 100 includes a controller 101. The inkjet recording apparatus 100 further includes supply pipe members 13*a* to 13 *c*, an ink supply unit 15, and a damper member 16 for each of the recording heads 11 (specifically, each of the first recording head 11C, the second recording head 11M, the third recording head 11Y, and the fourth recording head 11K). The ink supply unit 15 supplies a corresponding one of the inks to the damper member 16. The damper member 16 supplies the ink to the recording head 11 through the supply pipe members 13*a* to 13*c*. The controller 101 controls the ink supply unit 15. The controller 101 also controls the recording head 11.

In other words, although omitted for the sake of drawing preparation, the inkjet recording apparatus 100 includes four supply pipe members 13*a* to 13*c*, four ink supply units 15, and four damper members 16 for the respective four recording heads 11 (the first recording head 11C, the second recording head 11M, the third recording head 11Y, and the fourth recording head 11K).

The ink supply unit 15 includes an ink tank 151, a sub-tank 153 (ink reservoir), a sub-tank pump 152, a diaphragm pump 154 (supply pump), a first pipe 161, a second pipe 162, a third pipe 163, a circulation pipe 164, a first valve 162*a*, a second valve 163*a*, a third valve 164*a*, a circulation pump 164*b*, a relief valve 170, and a relief pipe 171.

The ink tank 151 contains an ink I corresponding to one of the inks. The ink tank 151 is connected to the sub-tank 153 through the first pipe 161. The first pipe 161 allows the ink I to flow from the ink tank 151 to the sub-tank 153. The sub-tank 153 stores the ink I supplied from the ink tank 151.

The sub-tank pump 152 is placed in the first pipe 161. The sub-tank pump 152 supplies the ink I stored in the ink tank 151 to the sub-tank 153 according to an instruction from the controller 101, for example, when the level of the liquid surface of the ink I in the sub-tank 153 reaches below a predetermined level.

The ink I is supplied from the sub-tank 153 to the recording head 11 via the damper member 16 in the inkjet recording apparatus 100. The recording head 11 ejects to the recording medium sheet M at least a portion of the ink supplied from the damper member 16 and discharges the rest of the ink I (ink that has not been ejected) to the ink supply unit 15. Specifically, the ink I discharged from the recording head 11 is returned to the sub-tank 153. That is, the ink I mainly circulates between the sub-tank 153, the damper member 16, and the recording head 11.

The sub-tank 153 is connected to the diaphragm pump 154 through the second pipe 162. The second pipe 162 allows the ink I to flow from the sub-tank 153 to the diaphragm pump 154. The diaphragm pump 154 is connected to the damper member 16 through the third pipe 163. The third pipe 163 allows the ink I to flow from the diaphragm pump 154 to the damper member 16.

The diaphragm pump 154 sucks the ink I stored in the sub-tank 153 through the second pipe 162. The diaphragm pump 154 discharges the ink I sucked from the sub-tank 153 to the third pipe 163. Specifically, the diaphragm pump 154 includes a cylinder and a piston. The cylinder stores the ink I sucked from the sub-tank 153. The cylinder is cylindrical, for example. The cylinder has a bottom in which an inlet and an outlet are formed. The inlet is connected to the second pipe 162. The outlet is connected to the third pipe 163.

The piston is inserted in the cylinder. The piston moves in a direction away from the bottom of the cylinder according to an instruction from the controller 101. The piston also moves in a direction towards the bottom of the cylinder according to an instruction from the controller 101.

When the piston moves in the direction away from the bottom of the cylinder, the ink I is sucked into the cylinder. Specifically, the ink I flows out from the sub-tank 153 into the second pipe 162 and enters the cylinder through the second pipe 162.

When the piston moves in the direction toward the bottom of the cylinder, the ink I flows into the third pipe 163 from the cylinder to be supplied to the damper member 16 through the third pipe 163.

The first valve 162*a* is placed in the second pipe 162. The second valve 163*a* is placed in the third pipe 163. The first valve 162*a* and the second valve 163*a* open and close according to instructions from the controller 101. Specifically, during the piston moving in the direction away from the bottom of the cylinder, the first valve 162*a* is opened while the second valve 163*a* is closed. During the piston moving in the direction toward the bottom of the cylinder, the first valve 162*a* is closed while the second valve 163*a* is opened.

The damper member 16 supplies the ink I to the recording head 11 through the supply pipe members 13*a* to 13*c*. The damper member 16 has a function of mitigating change in pressure of the ink I supplied to the recording head 11. The damper member 16 includes at least an ink passing section through which the ink I passes. The damper member 16 may further includes an ink storage chamber for temporal ink storage. Parts of the damper member 16 that constitute for example the ink passing section and the ink storage chamber are formed from an elastic member (e.g., resin film). In the above configuration, the damper member 16 can mitigate change in pressure of the ink I by deforming the elastic member when the pressure of the ink I therein (in the ink passing section or the ink storage chamber) increases or decreases. As a result, change in pressure of the ink I supplied to the recording head is mitigated.

The circulation pipe 164 communicates the recording head 11 with the sub-tank 153. The third valve 164*a* is placed in the circulation pipe 164. The third valve 164*a* opens and closes according to an instruction from the controller 101. For example, the controller 101 causes the third valve 164*a* to open during the inkjet recording apparatus 100 performing image formation, and causes the third valve 164*a* to close during the inkjet recording apparatus 100 not performing image formation. For example, the third valve 164*a* is a check valve for preventing the ink I from flowing backward during the inkjet recording apparatus 100 not performing image formation.

The circulation pump 164*b* is placed in the circulation pipe 164. The circulation pump 164*b* sends the ink I in the circulation pipe 164 to the sub-tank 153. In association, the pressure in the circulation pipe 164 becomes lower than the pressure in the recording head 11. As a result, the ink I is discharged from the recording head 11 to the sub-tank 153 through the circulation pipe 164.

The controller 101 includes storage 102 and a processing device 103. The storage 102 stores data and programs therein. The storage 102 includes semiconductor memory such as random access memory (RAM) and read only memory (ROM), for example. The storage 102 may further includes a storage device such as a hard disk drive (HDD). The processing device 103 includes a processor such as a central processing unit (CPU) or a micro processing unit (MPU). The processing device 103 controls operation of each element of the inkjet recording apparatus 100 based on the programs stored in the storage 102.

The relief valve 170 is placed in the third pipe 163. The relief pipe 171 communicates the second pipe 162 with the third pipe 163 via the relief valve 170. The relief valve 170 and the relief pipe 171 constitute a relief mechanism. That is, the ink supply unit 15 includes a relief mechanism. The relief valve 170 is an independent member that is not controlled by the controller 101, for example. For example, the relief valve 170 is normally kept closed by its spring force and opened when the pressure of the ink I in the third pipe 163 reaches or exceeds a predetermined value. In the above configuration, the relief mechanism discharges the ink I in the third pipe 163 to the second pipe 162 through the relief pipe 171 when the pressure of the ink I in the third pipe 163 reaches or exceeds the predetermined value. In the manner described above, the relief mechanism adjusts the pressure of the ink I (i.e., pressure of the ink I supplied to the damper member 16) in the third pipe 163 so as not to exceed the predetermined value.

The pressure of the ink I circulating between the sub-tank 153 and the recording head 11 varies depending on an image to be formed by the inkjet recording apparatus 100. Specifically, the recording head 11 consumes a large amount of the ink I when the inkjet recording apparatus 100 forms images with high image density. This reduces the pressure of the circulating ink I, for example. By contrast, when the inkjet recording apparatus 100 forms images with low image density, the recording head 11 consumes a relatively small amount of the ink I. As a result, the pressure of the circulating ink I is increased. Change in pressure of the circulating ink I is mitigated to some extent by adjusting the operation speed of the piston of the diaphragm pump 154, but this is not sufficient. Abrupt increase or decrease in ink pressure (particularly, abrupt increase in ink pressure) may cause ink agglomeration in a known inkjet recording apparatus. By contrast, the ink I in the inkjet recording apparatus 100 hardly agglomerates as described above. The inkjet recording apparatus 100, which includes the relief mechanism and the damper member 16, can inhibit abrupt increase and decrease in pressure of the ink I. Therefore, the inkjet recording apparatus 100 can inhibit occurrence of ink agglomeration.

One example of the inkjet recording apparatus of the present embodiment has been described so far. However, the inkjet recording apparatus of the present embodiment is not limited to that illustrated in FIGS. 1 and 2.

With reference to FIGS. 1 and 2, the inkjet recording apparatus 100 including four recording heads 11 for the four inks has been described as an example. However, the number of the recording heads included in the inkjet recording apparatus of the present embodiment is not limited particularly, and may be at least 1 and no greater than 10, and preferably at least 3 and no greater than 5. The inkjet recording apparatus 100 ejects the inks of four colors, cyan, magenta, yellow, and black in the stated order. However, the types, combination, and ejection order of the inks in the inkjet recording apparatus of the present embodiment are not limited to the above.

Furthermore, the essential members of the inkjet recording apparatus of the present embodiment are only the ink, the circulation type recording heads, the damper member, and the ink supply unit. The relief mechanism may have any configuration other than inclusion of the relief valve and the relief pipe, so long as the relief mechanism has a function of reducing the ink pressure below the predetermined value when the pressure of the ink supplied to the damper member reaches or exceeds the predetermined value. Furthermore, the supply pump may be a pump other than the diaphragm pump.

In addition, the inkjet recording apparatus of the present embodiment may be a multifunction peripheral having an additional function of a scanner, a copier, a printer, or a facsimile machine.

EXAMPLES

Examples of the present disclosure are described below. However, the present disclosure is not limited to the following examples.

[Preparation of Black Pigment Dispersion]

A black pigment dispersion was prepared for used in ink preparation. Table 3 shows the components contained in the black pigment dispersion and their amounts.

TABLE 3

| | | Black pigment dispersion |
|---|---|---|
| Percentage content [% by mass] | Water | 80 |
| | Resin A-Na | 5 |
| | Black pigment | 15 |
| | Total | 100 |

In Table 3, "Resin A-Na" refers to a resin A (pigment coating resin) neutralized with sodium hydroxide (NaOH). "Black pigment" refers to a black pigment ("MONARCH (registered Japanese trademark) 800", product of Cabot Corporation).

[Preparation of Resin A]

The resin A was prepared by the following method for obtaining the resin A-Na in Table 3. In detail, a stirrer, a nitrogen inlet tube, a condenser, and a dropping funnel were set at a four-necked flask. Next, 100 parts by mass of isopropyl alcohol and 300 parts by mass of methyl ethyl ketone were added into the flask. Heat reflux at 70° C. was performed on the flask contents under nitrogen bubbling.

Next, a solution L1 was prepared. In detail, 40.0 parts by mass of styrene, 10.0 parts by mass of methacrylic acid, 40.0 parts by mass of methyl methacrylate, 10.0 parts by mass of butyl acrylate, 0.4 parts by mass of azobisisobutyronitrile (AIBN, polymerization initiator) were mixed to obtain a solution L1 being a monomer solution. The solution L1 was added dropwise into the flask over 2 hours while the flask contents were undergoing heat reflux at 70° C. After the dropwise addition, the flask contents underwent heat reflux at 70° C. for additional 6 hours.

Next, a solution L2 was prepared. In detail, 0.2 parts by mass of AIBN and 150.0 parts by mass of methyl ethyl ketone were mixed to obtain the solution L2. The solution L2 was added dropwise into the flask over 15 minutes. After the dropwise addition, the flask contents underwent heat reflux at 70° C. for additional 5 hours. In the manner described above, the resin A (styrene-(meth)acrylic resin) was obtained. The resulting resin A had a mass average molecular weight (Mw) of 20,000 and an acid value of 100 mgKOH/g.

Here, the mass average molecular weight Mw of the resin A was measured under the following conditions using a gel filtration chromatography ("HLC-8020GPC", product of Tosoh Corporation).

Column: "TSKGEL SUPER MULTIPORE HZ-H" produced by Tosoh Corporation (4.6 mm I.D.×15 cm semi-micro column)

Number of columns: 3

Eluent: tetrahydrofuran

Flow rate: 0.35 mL/min

Sample injection amount: 10 μL

Measurement temperature: 40° C.

Detector: IR detector

A calibration curve was plotted using n-propylbenzene and seven polystyrenes "F-40", "F-20", "F-4", "F-1", "A-5000", "A-2500", and "A-1000" selected from TSKgel standard polystyrenes produced by Tosoh Corporation.

The acid value of the resin A was measured by a method in accordance with the Japanese Industrial Standards (JIS) K0070-1992 (Test methods for acid value, saponification value, ester value, iodine value, hydroxyl value and unsaponifiable matter of chemical products).

[Preparation of Black Pigment Dispersion]

While the resin A was heated using a hot bath at 70° C., a sodium hydroxide aqueous solution in an amount necessary for neutralizing the resin A was added to the resin A. Specifically, the sodium hydroxide aqueous solution with a mass of 1.1 times the neutralization equivalent was added to the resin A. In the manner described above, an aqueous solution of the resin A (resin A-Na) neutralized with sodium hydroxide was obtained. The aqueous solution of the resin A-Na had a pH of 8.

The vessel of a media type disperser ("DYNO (registered Japanese trademark) MILL", product of Willy A. Bachofen AG) was charged with 5 parts by mass of the aqueous solution containing the resin A-Na, 15 parts by mass of the black pigment, and water so that the total amount thereof reached 100 parts by mass at the blending ratio shown in Table 3. Note that the mass of the water added was 80 parts by mass, including the mass of water contained in the sodium hydroxide aqueous solution used for neutralizing the resin A and the mass of water produced through the neutralization reaction.

Next, a medium (zirconia beads with a diameter of 1.0 mm) was loaded into the vessel so that the loading rate reached 70% by volume relative to the capacity of the vessel. Using the media type disperser, the vessel contents were dispersed. In the manner described above, a black pigment dispersion was obtained.

The black pigment dispersion was diluted 300 times with water to obtain a dilution. The dilution was measured using a dynamic light scattering type particle size distribution analyzer ("ZETASIZER (registered Japanese trademark) NANO ZS", product of Malvern Instruments Ltd.) to determine the volume median diameter (D50) of pigment particles contained in the black pigment dispersion. The measurement confirmed that the pigment particles with a volume median diameter of at least 70 nm and no greater than 130 nm were dispersed in the black pigment dispersion.

[Resin Emulsions]

Resin emulsions (R-1) to (R-9) shown in Table 4 were prepared as resin emulsions used in ink preparation. The resin emulsions (R-1) to (R-9) included binder resin particles (r-1) to (r-9), respectively. The resin emulsion (R-1) was a product from NICCA CHEMICAL CO., LTD. The resin emulsion (R-2) was a product from UNITIKA LTD. The resin emulsion (R-3) was a product form Japan Coating Resin Corporation. The resin emulsions (R-4) to (R-9) each were a product from DKS Co. Ltd. In Table 4, "Tg" refers to glass transition point. "(R)" refers to registered Japanese trademark. "PEs" refers to polyester resin.

TABLE 4

| Resin emulsion | | Binder resin particles | | | | | |
|---|---|---|---|---|---|---|---|
| | | | Resin | Breaking elongation | $D_{50}$ | Tg | Zeta potential |
| Type | Product number | Type | species | [%] | [nm] | [° C.] | [mV] |
| R-1 | EVAFANOL (R) HA-560 | r-1 | Urethane | 50 | 40 | 50 | −53.3 |
| R-2 | ELITEL (R) KT-8803 | r-2 | PEs | 50 | 80 | 60 | −55.2 |
| R-3 | MOWINYL (R) 6820 | r-3 | Acryl | 10 | 80 | 35 | −53.9 |
| R-4 | SUPERFLEX (R) SF-170 | r-4 | Urethane | 50 | 10 | 75 | −51.1 |
| R-5 | SUPERFLEX (R) SF-150 | r-5 | Urethane | 330 | 30 | 40 | −49.6 |
| R-6 | SUPERFLEX (R) E-2000 | r-6 | Urethane | 1350 | 700 | −38 | −30.0 |
| R-7 | SUPERFLEX (R) SF-460 | r-7 | Urethane | 700 | 40 | −21 | −50.3 |
| R-8 | SUPERFLEX (R) SF-860 | r-8 | Urethane | 3 | 200 | 36 | −49.8 |
| R-9 | SUPERFLEX (R) SF-820 | r-9 | Urethane | 5 | 30 | 46 | −31.5 |

[Zeta Potential Measurement]

The zeta potential of each of the binder resin particles (r-1) to (r-9) shown in Table 4 was measured by the following method. With respect to each of the resin emulsions (R-1) to (R-9), the resin emulsion was diluted with water first so that the percentage content of corresponding ones of the binder resin particles (r-1) to (r-9) in the resin emulsion reached 10% by mass. Next, the zeta potential of the resulting dilution (specifically, a dilution containing 90 parts by mass of water and 10 parts by mass of any of the binder resin particles (r-1) to (r-9)) being a measurement target was measured at a measured temperature of 25° C. using a laser Doppler zeta type potential analyzer ("ELSZ-1000", product of Otsuka Electronics Co., Ltd.) to obtain a zeta potential distribution. The zeta potential distribution was expressed by a graph with zeta potential (unit: mV) on the horizontal axis and intensity on the vertical axis. From the zeta potential distribution, a value (peak value) of the zeta potential of the measurement target was obtained.

<Ink Preparation>

Inks (I-1) to (I-13) were prepared by the following methods.

[Ink (I-1)]

A beaker was charged with water, 20.0 parts by mass of the black pigment dispersion (black pigment: 3.0 parts by mass, resin A-Na: 1.0 part by mass), the resin emulsion (R-1), 25.0 parts by mass of propylene glycol, 8.0 parts by mass of triethylene glycol monobutyl ether, and 0.3 parts by mass of a silicone surfactant ("SILFACE (registered Japanese trademark) SAG503A", product of Nissin Chemical Industry Co., Ltd., polyether modified siloxane compound). The amount of the resin emulsion (R-1) added was adjusted so that the amount of the binder resin particles (r-1) contained in the resulting mixture in the beaker was the amount shown in Table 5 (5.0 parts by mass for Example 1). The amount of the water added was such that the total amount of the resulting mixture in the beaker was 100 parts by mass. The beaker contents were mixed at a rotational speed of 400 rpm using a stirrer ("THREE-ONE MOTOR BL-600", product of Shinto Scientific Co., Ltd.) to obtain a mixed liquid. The mixed liquid was filtered using a filter (pore diameter 5 μm) to remove foreign matter and coarse particles contained in the mixed liquid. Thus, the ink (I-1) was obtained.

[Inks (I-2) to (I-13)]

The inks (1-2) to (I-13) were prepared according to the same method as that for preparing the ink (I-1) in all aspects other than that the types and amounts of components were changed to those shown in Tables 5 and 6.

In Tables 5 and 6, the numerical values are expressed as percentage contents [% by mass]. "1,3-PD" refers to 1,3-propanediol. "TEGMBE" refers to triethylene glycol monobutyl ether. "MBD" refers to 3-methyl-1,3-butanediol. "Surfactant" refers to the aforementioned silicone surfactant.

TABLE 5

| | | Ink | | | | | | |
|---|---|---|---|---|---|---|---|---|
| | | I-1 | I-2 | I-3 | I-4 | I-5 | I-6 | I-7 |
| Composition [% by mass] | Black pigment | 3.0 | 3.0 | 3.0 | 3.0 | 3.0 | 3.0 | 3.0 |
| | Pigment coating resin | 1.0 | 1.0 | 1.0 | 1.0 | 1.0 | 1.0 | 1.0 |
| | Resin particles (r-1) | 5.0 | — | 8.0 | 3.0 | 5.0 | 5.0 | — |
| | Resin particles (r-2) | — | — | — | — | — | — | 5.0 |
| | Resin particles (r-3) | — | — | — | — | — | — | — |
| | Resin particles (r-4) | — | 5.0 | — | — | — | — | — |
| | Resin particles (r-5) | — | — | — | — | — | — | — |
| | Resin particles (r-6) | — | — | — | — | — | — | — |
| | Resin particles (r-7) | — | — | — | — | — | — | — |
| | Resin particles (r-8) | — | — | — | — | — | — | — |
| | Resin particles (r-9) | — | — | — | — | — | — | — |
| | 1,3-PD | — | — | — | — | 25.0 | 28.0 | — |
| | Propylene glycol | 25.0 | 25.0 | 25.0 | 25.0 | — | — | 25.0 |
| | TEGMBE | 8.0 | 8.0 | 8.0 | 8.0 | — | 5.0 | 8.0 |
| | MBD | — | — | — | — | 5.0 | — | — |
| | Surfactant | 0.3 | 0.3 | 0.3 | 0.3 | 0.3 | 0.3 | 0.3 |
| | Water | Rest | Rest | Rest | Rest | Rest | Rest | Rest |
| | Total | 100.0 | 100.0 | 100.0 | 100.0 | 100.0 | 100.0 | 100.0 |

TABLE 6

| | | Ink | | | | | |
|---|---|---|---|---|---|---|---|
| | | I-8 | I-9 | I-10 | I-11 | I-12 | I-13 |
| Composition [% by mass] | Black pigment | 3.0 | 3.0 | 3.0 | 3.0 | 3.0 | 3.0 |
| | Pigment coating resin | 1.0 | 1.0 | 1.0 | 1.0 | 1.0 | 1.0 |
| | Resin particles (r-1) | — | — | — | — | — | — |
| | Resin particles (r-2) | — | — | — | — | — | — |
| | Resin particles (r-3) | 5.0 | — | — | — | — | — |
| | Resin particles (r-4) | — | — | — | — | — | — |
| | Resin particles (r-5) | — | 5.0 | — | — | — | — |
| | Resin particles (r-6) | — | — | 5.0 | — | — | — |
| | Resin particles (r-7) | — | — | — | 5.0 | — | — |
| | Resin particles (r-8) | — | — | — | — | 5.0 | — |
| | Resin particles (r-9) | — | — | — | — | — | 5.0 |
| | 1,3-PD | — | — | — | — | — | — |
| | Propylene glycol | 25.0 | 25.0 | 25.0 | 25.0 | 25.0 | 25.0 |
| | TEGMBE | 8.0 | 8.0 | 8.0 | 8.0 | 8.0 | 8.0 |
| | MBD | — | — | — | — | — | — |
| | Surfactant | 0.3 | 0.3 | 0.3 | 0.3 | 0.3 | 0.3 |
| | Water | Rest | Rest | Rest | Rest | Rest | Rest |
| | Total | 100.0 | 100.0 | 100.0 | 100.0 | 100.0 | 100.0 |

<Evaluation>

Inkjet recording apparatuses of Examples 1 to 8 and Comparative Examples 1 to 6 were prepared by the following method. With respect to each of the inkjet recording apparatuses, ink circulation stability (ink agglomeration inhibition during ink circulation and stability of ink circulation flow rate) and stability of ink ejection amount were evaluated. Evaluation results are shown in Table 7. Note that the evaluations were carried out at a temperature of 25° C. and a relative humidity of 60% unless otherwise stated.

[Apparatus]

A test apparatus (test machine produced by KYOCERA Document Solutions Japan Inc.) was prepared that included at least a circulation type recording head and an ink circulation pump ("CIRCULATION PUMP CIMS", product of Megnajet). The ink circulation pump corresponds to the ink supply unit in the embodiment and was set to perform ink supply to the circulation type recording head. The circulation type recording head was set to eject at least a portion of ink supplied from the ink circulation pump to a recording medium sheet according to necessity and return the rest of the supplied ink to the ink circulation pump. Note that, the circulation type recording head was set to totally return the ink supplied from the ink circulation pump to the circulation pump during a state in which the ink does not need to be ejected (state of not performing image formation).

In the test apparatus, the damper member was able to be mounted between the ink circulation pump and the circulation type recording head. When the damper member is mounted in the test apparatus, the ink supplied from the ink circulation pump is supplied to the circulation type recording head via the damper member. A relief mechanism (a relief valve and a relief flow channel) was able to be mounted in the ink circulation pump. The relief valve had a function of discharging ink into the relief flow channel when the ink sent to the damper member reaches or exceeds a predetermined pressure. The relief flow channel was connected so as to return the ink discharged through the relief valve to the vicinity of the inlet of the ink circulation pump. As shown in Table 7, the test apparatus with the relief valve and the damper member mounted therein and any one of the inks (I-1) to (I-13) were combined to prepare inkjet recording apparatuses of Examples 1 to 8 and Comparative Examples 1 to 3, 5, and 6. In addition, a test apparatus with neither the relief valve nor the damper member mounted therein and the ink (I-1) were combined to prepare an inkjet recording apparatus of Comparative Example 4. Note that no filter was present in the circulation flow channel of each of the inkjet recording apparatuses.

[Ink Agglomeration Inhibition During Ink Circulation]

Using any of the inkjet recording apparatuses, the corresponding ink was circulated for 6 hours (first circulation test) with the set flow rate of the ink circulation pump set to 60±5 mL/min. The first circulation test was carried out with the circulation type recording head uncapped (uncapped state). In the first circulation test, the circulation type recording head did not perform ink ejection. That is, the ink sent out from the ink circulation pump was supplied to the circulation type recording head directly or indirectly via the damper member in the inkjet recording apparatus. The ink supplied to the circulation type recording head was returned to the ink circulation pump without being ejected. After the first circulation test, 500 mL of ink was collected from the inkjet recording apparatus. Next, the ink after the first circulation test was filtered using a filter with a pore diameter of 5 μm and the volume of the filtered ink was measured. The measured volume of the filtered ink was used as an evaluation value for ink agglomeration inhibition during ink circulation. The volume of the filtered ink reduces when the ink agglomerates during circulation. Therefore, the more effectively an inkjet recording apparatus can inhibit ink agglomeration during ink circulation, the larger the volume of the filtered ink becomes (close to 500 mL). Ink agglomeration inhibition during ink circulation was evaluated according to the following criteria.

(Criteria of Ink Agglomeration Inhibition During Ink Circulation)

A (good): volume of filtered ink of at least 450 mL and no greater than 500 mL

B (poor): volume of filtered ink of at least 300 mL and less than 450 mL

C (very poor): volume of filtered ink of less than 300 mL

[Stability of Ink Circulation Flow Rate]

Using any of the inkjet recording apparatuses, the corresponding ink was circulated for 6 hours (second circulation test) with the set flow rate of the ink circulation pump set to 60±3 ml/min. The second circulation test was carried out with the circulation type recording head uncapped (uncapped state). In the second circulation test, the circulation type recording head did not perform ink ejection. That is, the ink sent out from the ink circulation pump was supplied to the circulation type recording head directly or indirectly via the damper member in the inkjet recording apparatuses. The ink supplied to the circulation type recording head was returned to the ink circulation pump without being ejected. At directly after the start and directly before the end of the second circulation test, the actual flow rates (initial flow rate X and post-circulation flow rate Y) of the ink circulating in the inkjet recording apparatus were measured. Note that the values indicated in a terminal for control use (control software installed) connected to the ink circulation pump were referenced for the initial flow rate X and the post-circulation flow rate Y. A rate of change in ink flow rate of the ink in the second circulation test was calculated by applying the initial flow rate X and the post-circulation flow rate Y to the following equation. Stability of ink circulation flow rate was evaluated according to the following criteria.

$$\text{Flow rate change rate [\%]} = 100 \times (Y - X)/Y$$

(Criteria of Stability of Ink Circulation Flow Rate)

A (good): flow rate change rate of less than 15%

B (poor): flow rate change rate of 15% or more

[Stability of Ink Ejection Amount]

Using any of the inkjet recording apparatuses, the corresponding ink was circulated for 6 hours (third circulation test) with the set flow rate of the ink circulation pump set to 60 mL/min. The third circulation test was carried out with the circulation type recording head uncapped (uncapped state). Directly after the start of the third circulation test, a solid image was formed on a recording medium sheet using the inkjet recording apparatus. In doing so, the ink ejection amount (volume per one drop of ink) of the circulation type recording head was set to 6 pL. The formed solid image was used as a first evaluation image. The recording medium sheet used was PET film ("FE2001", product of FUTAMURA CHEMICAL CO., LTD., corona discharge treatment on one side). In detail, the image was formed on the side of the PET film that has undergone the corona discharge treatment.

Directly before the end of the third circulation test, a solid image was formed again on a recording medium sheet using the inkjet recording apparatus. In doing so, the ink ejection amount (volume per one drop of ink) of the circulation type recording head was set to 6 pL. The formed solid image was used as a second evaluation image.

The first evaluation image and the second evaluation image were dried at 100° C. for 5 minutes directly after the formation. Next, the first evaluation image and the second evaluation image after the drying were left to stand at room temperature for 1 hour. Thereafter, the Lab values (L value, a value, and b value) of each of the first evaluation image and the second evaluation image were measured using a fluorescence spectrodensitometer ("FD-5", product of KONICA MINOLTA, INC.).

Based on the Lab values of the first evaluation image (solid image formed directly after the start of the third circulation test) and the Lab values of the second evaluation image (solid image formed directly before the end of the third circulation test), an amount (ΔL) of change of the L value, an amount (Δa) of change of the a value, and an amount (Δb) of change of the b value were obtained. Next, an amount (ΔE) of change of the Lab values was calculated by applying ΔL, Δa, and Δb to the following equation. Stability of ink ejection amount was evaluated according to the following criteria based on ΔE.

$$\Delta E = \left[(\Delta L)^2 + (\Delta a)^2 + (\Delta b)^2\right]^{1/2}$$

(Criteria of Stability of Ink Ejection Amount)

A (good): ΔE of no greater than 2.0

B (poor): ΔE of greater than 2.0

Note that "Y" in the column titled "Damper member and relief valve" indicates that the corresponding inkjet recording apparatus includes the damper member and the relief valve. "N" in the column titled "Damper member and relief valve" indicates that the corresponding inkjet recording apparatus included neither the damper member nor the relief valve.

TABLE 7

| | | Example | | | | | | | |
|---|---|---|---|---|---|---|---|---|---|
| | | 1 | 2 | 3 | 4 | 5 | 6 | 7 | 8 |
| Ink | | I-1 | I-2 | I-3 | I-4 | I-5 | I-6 | I-7 | I-8 |
| Damper member and relief valve | | Y | Y | Y | Y | Y | Y | Y | Y |
| Ink agglomeration inhibition during ink circulation | Measurement value [mL] | 500 | 500 | 500 | 500 | 500 | 500 | 500 | 500 |
| | Rating | A | A | A | A | A | A | A | A |
| Stability of ink circulation flow rate | Flow rate change rate [%] | 1 | 2 | 2 | 1 | 1 | 2 | 1 | 2 |
| | Rating | A | A | A | A | A | A | A | A |
| Stability of ink ejection amount | ΔE | 0.01 | 0.1 | 0.05 | 0.2 | 0.3 | 0.02 | 0.2 | 0.2 |
| | Rating | A | A | A | A | A | A | A | A |

| | | Comparative Example | | | | | |
|---|---|---|---|---|---|---|---|
| | | 1 | 2 | 3 | 4 | 5 | 6 |
| Ink | | I-9 | I-10 | I-11 | I-1 | I-12 | I-13 |
| Damper member and relief valve | | Y | Y | Y | N | Y | Y |
| Ink agglomeration inhibition during ink circulation | Measurement value [mL] | 420 | 10 | 400 | 5 | 440 | 100 |
| | Rating | B | C | B | C | B | C |
| Stability of ink circulation flow rate | Flow rate change rate [%] | 10 | 20 | 12 | 25 | 8 | 22 |
| | Rating | A | B | A | B | A | B |
| Stability of ink ejection amount | ΔE | 1.5 | 53.0 | 30.0 | 3.2 | 1.2 | 5.1 |
| | Rating | A | B | B | B | A | B |

As shown in Tables 3 to 7, the inkjet recording apparatuses of Examples 1 to 8 each included an ink, a circulation type recording head, a damper member that supplies the ink to the circulation type recording head, and an ink supply unit that supplies the ink to the damper member. The circulation type recording head ejected to a recording medium sheet at least a portion of the ink supplied from the damper member and discharged the rest of the ink to the ink supply unit. The ink supply unit included a relief mechanism. The relief mechanism adjusted the pressure of the ink supplied to the damper member to a level no greater than a predetermined value. The ink contained a pigment, binder resin particles, and an aqueous medium. The binder resin particles had a zeta potential of at least −60.0 mV and no greater than −45.0 mV. The zeta potential was measured at 25° C. for a mixed liquid as a measurement sample containing 10 parts by mass of the binder resin particles and 90 parts by mass of water. The binder resin particles had a volume median diameter of at least 5 nm and no greater than 100 nm. The binder resin particles had a breaking elongation at 25° C. of no greater than 60%. The inkjet recording apparatuses of Examples 1 to 8 inhibited ink agglomeration during ink circulation and had excellent stability of ink circulation flow rate and stability of ink ejection amount.

By contrast, the inkjet recording apparatuses of Comparative Examples 1 to 3 each had low strength (breaking elongation of greater than 60%) of the binder resin particles contained in the ink. The inkjet recording apparatus of Comparative Example 2 included an ink containing binder resin particles with a volume median diameter of greater than 100 nm and a zeta potential of greater than −45.0 mV. From the above, it is thought that collapse and similar events of the binder resin particles contained in the ink occurred during ink circulation, leading to ink agglomeration in the inkjet recording apparatuses of Comparative Examples 1 to 3. Also, the inkjet recording apparatuses of Comparative Examples 2 and 3 were rated as poor for at least one of stability of ink circulation flow rate and stability of ink ejection amount due to ink agglomeration.

The inkjet recording apparatus of Comparative Example 4 included neither the damper member nor the relief valve. It is thought that the binder resin particles contained in the ink readily collapse upon occurrence of abrupt change in ink pressure during ink circulation in the inkjet recording apparatus of Comparative Example 4. From the above, it is thought that ink agglomeration occurred during ink circulation in the inkjet recording apparatus of Comparative Example 4. The inkjet recording apparatus of Comparative Example 4 was also rated as poor in stability of ink circulation flow rate and stability of ink ejection amount due to ink agglomeration.

The inkjet recording apparatus of Comparative Example 5 included an ink containing binder resin particle with a volume median diameter of greater than 100 nm. In the above configuration, it is thought that the binder resin particles collapsed upon occurrence of abrupt change in ink pressure during ink circulation, leading to ink agglomeration.

The inkjet recording apparatus of Comparative Example 6 included an ink containing binder resin particles with a zeta potential of greater than −45 V. The binder resin particles are therefore thought to have readily agglomerated. As a result, ink agglomeration occurred during ink circulation in the inkjet recording apparatus of Comparative Example 6. The inkjet recording apparatus of Comparative Example 6 was rated as poor in stability of ink circulation flow rate and stability of ink ejection amount due to ink agglomeration.

What is claimed is:

1. An inkjet recording apparatus comprising:
- an ink;
- a circulation type recording head;
- a damper member that supplies the ink to the circulation type recording head; and
- an ink supply unit that supplies the ink to the damper member, wherein
- the circulation type recording head ejects to a recording medium at least a portion of the ink supplied from the damper member and discharges rest of the ink to the ink supply unit,
- the ink supply unit includes a relief mechanism, an ink reservoir, and a supply pump,
- the relief mechanism includes a relief valve and a relief pipe and adjusts pressure of the ink supplied to the damper member to a level no greater than a predetermined value, and
- the relief valve is placed in a pipe connecting the supply pump and the damper member,
- when the pressure of the ink supplied to the damper member reaches or exceeds the predetermined value, the relief valve is opened to discharge the ink through the relief pipe.
- the ink reservoir stores the ink, and
- the supply pump sends out the ink stored in the ink reservoir to the damper member,
- the ink contains a pigment, binder resin particles, and an aqueous medium,
- the binder resin particles have a zeta potential of at least −60.0 mV and no greater than −45.0 mV,
- the zeta potential is measured at 25° C. for a mixed liquid as a measurement sample containing 10 parts by mass of the binder resin particles and 90 parts by mass of water,
- the binder resin particles have a volume median diameter of at least 5 nm and no greater than 100 nm, and
- the binder resin particles have a breaking elongation at 25° C. of no greater than 60%.

2. The inkjet recording apparatus according to claim 1, wherein
- the binder resin particles contain a binder resin, and
- the binder resin has a glass transition point of at least 45° C. and no greater than 90° C.

3. The inkjet recording apparatus according to claim 2, wherein
- the binder resin includes urethane resin.

4. The inkjet recording apparatus according to claim 1, wherein
- the ink further contains a surfactant, and
- the surfactant includes a silicone surfactant.

5. The inkjet recording apparatus according to claim 1, wherein
- the binder resin particles have a percentage content of at least 2.0% by mass and no greater than 10.0% by mass in the ink.

6. The inkjet recording apparatus according to claim 1, wherein
- the inkjet recording apparatus is used for front printing.

7. The inkjet recording apparatus according to claim 1, wherein
- the inkjet recording apparatus is used for image formation on a non-permeable recording medium.

8. The inkjet recording apparatus according to claim 1, wherein the supply pump is a diaphragm pump.

9. The inkjet recording apparatus according to claim 1, wherein the binder resin particles contain a binder resin, the binder resin includes urethane resin, the binder resin has a glass transition point of at least 45° C. and no greater than 55° C., the binder resin particles have a zeta potential of at least −56.0 mV and no greater than −50.0 mV, the binder resin particles have a volume median diameter of at least 35 nm and no greater than 45 nm, and the binder resin particles have a breaking elongation at 25° C. of at least 45% and no greater than 55%.

10. The inkjet recording apparatus according to claim 1, wherein the binder resin particles contain a binder resin, the binder resin includes polyester resin, the binder resin has a glass transition point of at least 55° C. and no greater than 65° C., the binder resin particles have a zeta potential of at least −58.0 mV and no greater than −52.0 mV, the binder resin particles have a volume median diameter of at least 75 nm and no greater than 85 nm, and the binder resin particles have a breaking elongation at 25° C. of at least 45% and no greater than 55%.

11. The inkjet recording apparatus according to claim 1, wherein the binder resin particles contain a binder resin, the binder resin includes acrylic resin, the binder resin has a glass transition point of at least 30° C. and no greater than 40° C., the binder resin particles have a zeta potential of at least −57.0 mV and no greater than −51.0 mV, the binder resin particles have a volume median diameter of at least 75 nm and no greater than 85 nm, and the binder resin particles have a breaking elongation at 25° C. of at least 8% and no greater than 12%.

12. The inkjet recording apparatus according to claim 1, wherein the binder resin particles contain a binder resin, the binder resin includes urethane resin, the binder resin has a glass transition point of at least 70° C. and no greater than 80° C., the binder resin particles have a zeta potential of at least −54.0 mV and no greater than −48.0 mV, the binder resin particles have a volume median diameter of at least 8 nm and no greater than 12 nm, and the binder resin particles have a breaking elongation at 25° C. of at least 45% and no greater than 55%.

* * * * *